(12) United States Patent
Hamilton, II et al.

(10) Patent No.: US 10,226,714 B2
(45) Date of Patent: Mar. 12, 2019

(54) AUTHENTICATION BASED ON CONFIGURATION OF INTERLOCKING BRICKS

(71) Applicant: INTERNATIONAL BUSINESS MACHINES CORPORATION, Armonk, NY (US)

(72) Inventors: Rick A. Hamilton, II, Charlottesville, VA (US); Clifford A. Pickover, Yorktown Heights, NY (US); Komminist S. Weldemariam, Nairobi (KE); Edgar A. Zamora Duran, Heredia (CR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 15/216,953

(22) Filed: Jul. 22, 2016

(65) Prior Publication Data
US 2018/0025139 A1 Jan. 25, 2018

(51) Int. Cl.
*G06F 21/34* (2013.01)
*A63H 33/04* (2006.01)
*G06F 21/36* (2013.01)

(52) U.S. Cl.
CPC .......... *A63H 33/042* (2013.01); *G06F 21/34* (2013.01); *G06F 21/36* (2013.01)

(58) Field of Classification Search
CPC ...... A63H 33/04; A63H 33/042; A63H 33/06; A63H 33/062; A63H 33/08; A63H 33/086; A63H 33/088; G06F 21/30; G06F 21/31; G06F 21/316; G06F 21/34; G06F 21/35; G06F 21/62; G06F 21/6218
See application file for complete search history.

(56) References Cited

U.S. PATENT DOCUMENTS

| | | | |
|---|---|---|---|
| 6,443,796 B1 | 9/2002 | Shackelford | |
| 7,316,567 B2 | 1/2008 | Hsieh et al. | |
| 7,555,658 B2 | 6/2009 | Vahid et al. | |
| 7,827,592 B2 | 11/2010 | Fifer et al. | |
| 8,079,890 B2 | 12/2011 | Seligman | |
| 8,221,182 B2 | 7/2012 | Seymour et al. | |
| 2009/0215357 A1* | 8/2009 | Seligman | A63H 33/042 446/127 |
| 2011/0217898 A1* | 9/2011 | Barber | A63H 33/042 446/91 |

(Continued)

*Primary Examiner* — Eric W Shepperd
(74) *Attorney, Agent, or Firm* — F. Chau & Associates, LLC

(57) ABSTRACT

A system of interlocking smart bricks includes a shell having at least one raised protrusion and at least one hole. A plurality of sensors is disposed within the shell. Each sensor is configured to detect a proximity of additional smart bricks. A processor receives proximity detection data from the plurality of sensors. A radio transmitter transmits the proximity detection data to a host device. The host device receives the proximity detection data, determines an arrangement of the shell therefrom, compares the determined arrangement of the shell with a known target arrangement, determines a degree of match between the arrangement of the shell and the known target arrangement based on the comparison, and authenticates a user to one of a plurality of authentication levels based on the degree of match.

15 Claims, 6 Drawing Sheets

(56) References Cited

U.S. PATENT DOCUMENTS

| | | |
|---|---|---|
| 2013/0109267 A1 | 5/2013 | Schweikardt et al. |
| 2013/0217294 A1* | 8/2013 | Karunaratne ........ A63H 33/042 446/90 |
| 2015/0089568 A1* | 3/2015 | Sprague .............. H04L 63/0876 726/1 |
| 2016/0156473 A1* | 6/2016 | Hewitt .................. H04L 9/3234 726/20 |
| 2016/0259306 A1* | 9/2016 | Pangrazio, III ....... H04L 9/3247 |

* cited by examiner

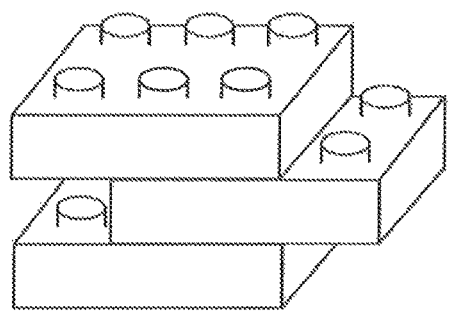
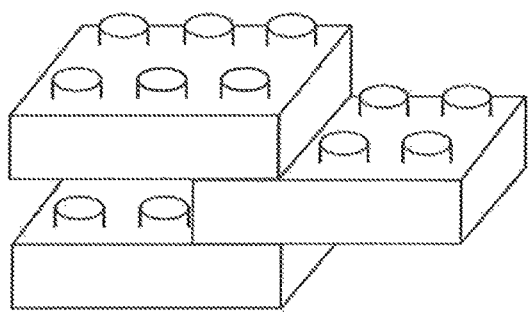
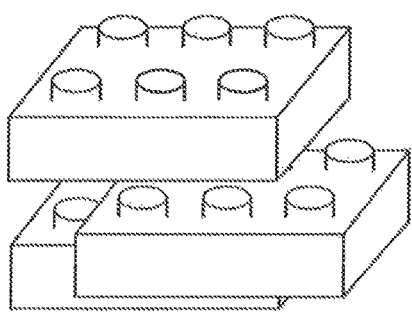
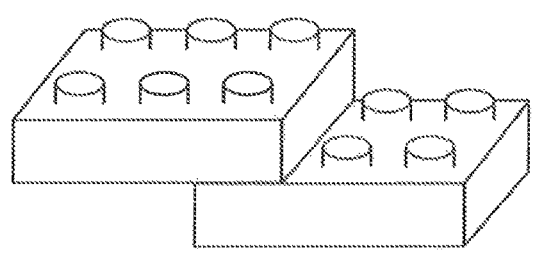
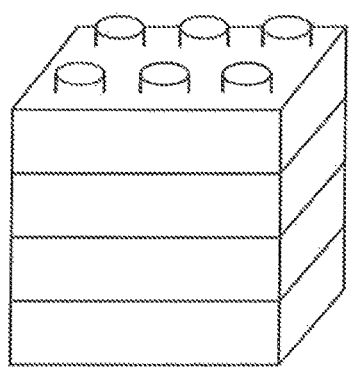
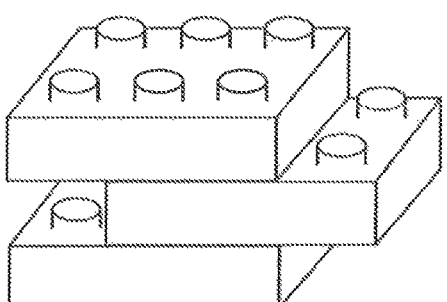
FIG. 1

AUTHENTICATION BASED ON CONFIGURATION OF INTERLOCKING BRICKS

BACKGROUND

1. Technical Field

The present disclosure relates to interlocking bricks and, more specifically, to approaches for providing authentication based on an arrangement or configuration of interlocking bricks.

2. Discussion of Related Art

Some popular children's toys provide children with a way of exploring their creativity and analytical skills by providing sets of interlocking bricks that may be connected to create various structures and designs. These interlocking bricks are often constructed of plastic and may include a set of raised protrusions on one side and a set of holes on an opposite side. The interlocking bricks may be fashioned as cuboids or any other shape, and are relatively easy to snap together and pull apart as the protrusions of one brick engage with the holes of another brick. It is common for interlocking bricks to be brightly and variously colored.

It is a defining characteristics of interlocking bricks that they may be used to create a wide variety of different configurations and arrangements, both simple and complex. It is also a characteristic of interlocking bricks that a configuration or arrangement of bricks can be created, broken apart, and then later re-created in an identical manner.

In a field thus far unrelated to the world of interlocking bricks, people are exploring ways of authenticating users to various electronic accounts, applications, and services. While passwords are still the most common means by which users authenticate themselves, other means of authentication include challenge questions, biometrics, and authenticating, chips, keys and dongles.

One limiting factor that is common among various existing means of authentication is that authentication is generally all-or-nothing. For example, a password is either entered correctly or incorrectly. A fingerprint is either recognized as authenticating or is not so-recognized. Therefore, where it is desired that multiple tiers of authentication be granted, users must memorize multiple passwords, etc.

Another limiting factor that is common among various existing means of authentication is that they tend to be inaccessible to children, or, in trying to be more accessible to children, wind up being too easy to circumvent, and therefore not particularly useful as means of secure authentication.

BRIEF SUMMARY

A system of interlocking smart bricks includes a shell having at least one raised protrusion and at least one hole. The at least one raised protrusion is configured for insertion into a hole having the same shape as the at least one hole. The at least one hole is configured for receiving a raised protrusion having the same shape as the at least one raised protrusion. A plurality of sensors is disposed within the shell. Each of the plurality of sensors is configured to detect a proximity of one or more additional smart bricks. A processor receives proximity detection data from the plurality of sensors. A radio transmitter transmits the proximity detection data to a host device. The host device receives the proximity detection data, determines an arrangement of the shell therefrom, compares the determined arrangement of the shell with a known target arrangement, determines a degree of match between the arrangement of the shell and the known target arrangement based on the comparison, and authenticates a user to one of a plurality of authentication levels based on the degree of match.

A pressure sensor may be disposed within the shell and may be configured to sense a degree of pressure applied to the shell. The processor may further receive data from the pressure sensor. The transmitter may further transmit the pressure sensor data to the host device. The host device may further receive the pressure sensor data. The host device may further compare the pressure sensor data to a known target pressure profile, determine a degree of match between the pressure sensor data and the known target pressure profile, and authenticate the user to the one of the plurality of authentication levels based on the degree of match between the pressure sensor data and the known target pressure profile.

A system of interlocking smart bricks includes a first interlocking brick having at least one raised protrusion disposed thereon and at least one sensor disposed thereon. The first interlocking brick further includes a processor. A second interlocking brick has at least one hole configured to receive the at least one raised protrusion of the first interlocking brick and to interlock with the first interlocking brick thereby. A host device is also included in the system of interlocking smart bricks. The processor is configured to receive sensor data from the at least one sensor and to transmit the received sensor data to the host device. The host device is configured to receive the transmitted sensor data and determine a spatial relationship between the first interlocking brick and the second interlocking brick therefrom and to authenticate a user based on the determined spatial relationship.

A pressure sensor may be disposed within the at least one interlocking brick. The pressure sensor may be configured to sense a degree of pressure applied to the at least one interlocking brick. The processor may further receive data from the pressure sensor and transmit the received pressure sensor data to the host device. The host device may further receive the pressure sensor data. The host device may further authenticate the user based on the pressure sensor data.

The host device may be configured to authenticate the user based on the determined spatial relationship by comparing the determined spatial relationship between the first interlocking brick and the second interlocking brick ("determined spatial relationship") with a known target relationship, determining a degree of match between the determined spatial relationship and the known target relationship based on the comparison, and authenticating the user to one of a plurality of authentication levels based on the degree of match.

A system of interlocking smart bricks includes a first interlocking brick having at least one raised protrusion disposed thereon. A second interlocking brick has at least one hole configured to receive the at least one raised protrusion of the first interlocking brick and to interlock with the first interlocking brick thereby. A camera module is configured to acquire image data including the first and second interlocking brick and to transmit the acquired image data to a host device. The host device is configured to receive the transmitted image data, determine a spatial relationship between the first interlocking brick and the second interlocking brick from the received image data, compare the determined spatial relationship with a known target spatial relationship, determining a degree of match between the determined spatial relationship and the known target spatial relationship based on the comparison, and authenticate a user to one of a plurality of authentication levels based on the degree of match.

The first interlocking brick or the second interlocking brick may include a visual code printed thereon and the host device may be further configured to identify the first interlocking brick or the second interlocking brick by interpreting the visual code.

The host device may be a personal computer and the camera module may be an integrated camera of the personal computer. The host device may be a smartphone or a tablet computer and the camera module may be an integrated camera of the smartphone or tablet computer. The camera module may include two lenses configured to acquire the image data from two distinct angles.

A method for authenticating a user includes receiving arrangement data describing an arrangement of a plurality of interlocking bricks, comparing the received arrangement data with a known target arrangement, determining a degree of match between the received arrangement data and the known target arrangement based on the comparison, and authenticating a user to one of a plurality of authentication levels based on the degree of match.

The arrangement of the plurality of interlocking bricks may include information pertaining to an identity of each of the plurality of interlocking bricks and the information pertaining to a spatial arrangement of each of the plurality of interlocking bricks relative to each other.

The known target arrangement may represent a predetermined model arrangement of a second plurality of interlocking bricks.

Authenticating the user to one of the plurality of authentication levels based on the degree of match may include providing access to more functions, features, rewards, or content to the user when the degree of match is relatively high and providing access to fewer functions, features, rewards, or content to the user when the degree of match is relatively low.

The authentication of the user may be for an account, an application, or a service.

A computer system includes a processor and a non-transitory, tangible, program storage medium, readable by the computer system, embodying a program of instructions executable by the processor to perform method steps for authenticating a user. The method includes receiving arrangement data describing an arrangement of a plurality of interlocking bricks, comparing the received arrangement data with a known target arrangement, determining a degree of match between the received arrangement data and the known target arrangement based on the comparison, and authenticating a user to one of a plurality of authentication levels based on the degree of match.

The arrangement of the plurality of interlocking bricks may include information pertaining to an identity of each of the plurality of interlocking bricks and the information pertaining to a spatial arrangement of each of the plurality of interlocking bricks relative to each other.

The known target arrangement may represent a predetermined model arrangement of a second plurality of interlocking bricks.

Authenticating the user to one of the plurality of authentication levels based on the degree of match may include providing greater access to the user when the degree of match is relatively high and providing reduced access to the user when the degree of match is relatively low.

The authentication of the user may be for an account, an application, or a service.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 is a diagram illustrating various arrangements/configurations for interlocking bricks in accordance with exemplary embodiments of the present invention;

DETAILED DESCRIPTION

Figure 2:
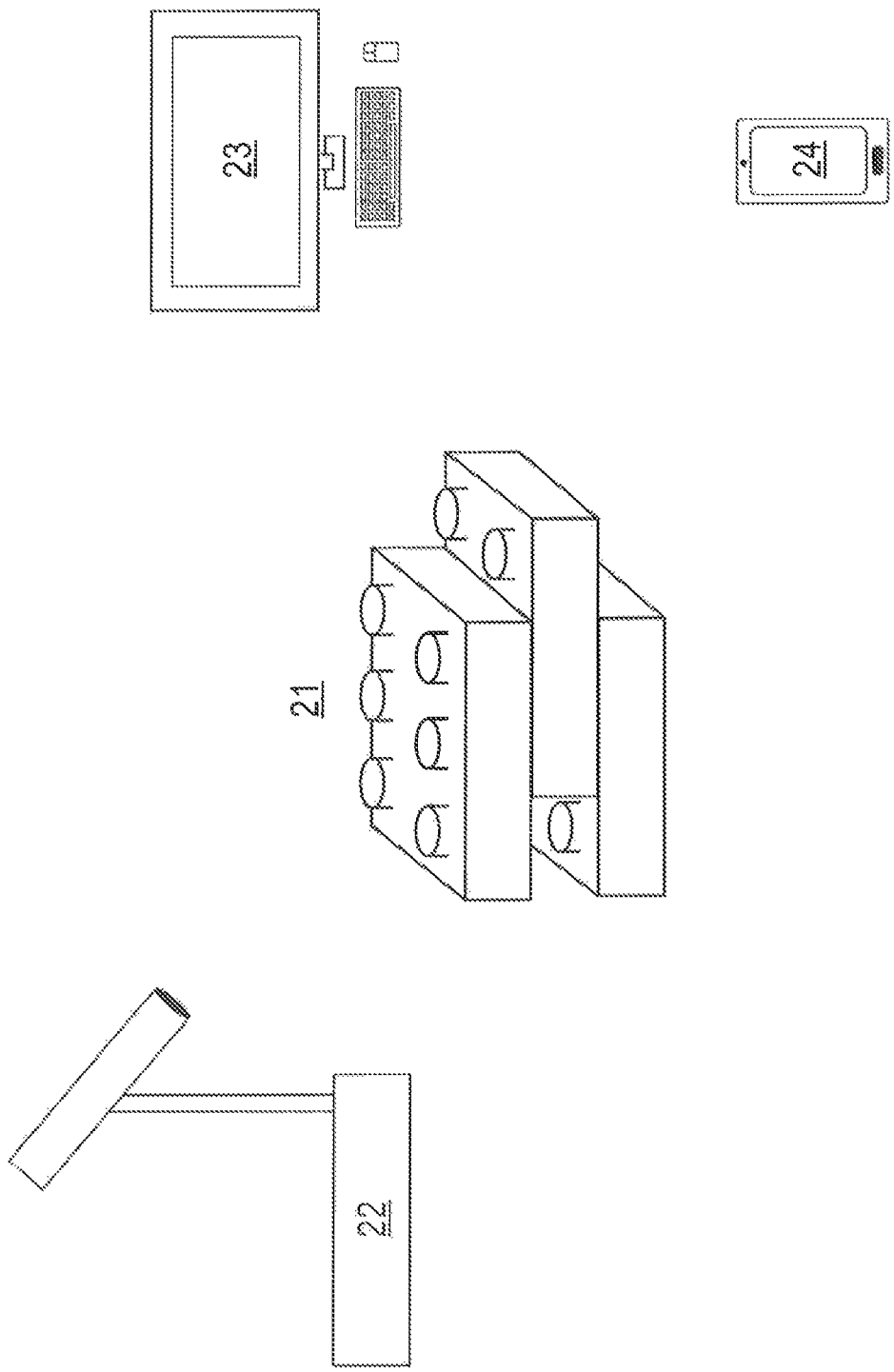
FIG. 2 is a schematic diagram illustrating an approach for identifying an arrangement of interlocking blocks in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide systems and methods for authentication to electronic accounts, services, applications, etc. by the arrangement and configuration of interlocking bricks, where there may be multiple levels of authentication available that may be granted according to a level of matching between a present arrangement/configuration of interlocking bricks and a stored target configuration.

Exemplary embodiments of the present invention may utilize either ordinary interlocking bricks, in combination with a computer vision-based detection apparatus, or may utilize specially-configured "smart bricks" which are interlocking bricks capable of identifying their own arrangement/configuration. In either case, a user uses interlocking bricks to try to reproduce a target arrangement/configuration and a determination is made, by computer vision techniques, self-identifying smart bricks, or by some combination thereof, as to a degree of similarity between the user's reproduction and the target. The user may thereafter be authenticated to one of a plurality of different levels of authentication, based on the determined degree of similarity. Various content may be authorized or unlocked to the user depending on the authentication level.

According to some exemplary embodiments of the present invention, the smart bricks might include, not only an exterior shell and various sensors, disposed therein, for determining their relative location among an arrangement/configuration of other smart bricks, but they may also include sensors for determining pressure so that the user may be challenged, not only to reproduce the target arrangement/configuration, but the user may also be challenged to handle the reproduction in a particular way, such as by applying a particular grip or pattern of pressure at predetermined regions. The handling of the reproduction may thereafter be matched against a target to ascertain a degree of similarity, which may be used in conjunction with the prior-described degree of similarity, to establish an appropriate level of authentication for granting or authorizing access to services, application (e.g., games), etc.

FIG. 1 is a diagram illustrating various arrangements/configurations for interlocking bricks in accordance with exemplary embodiments of the present invention. While the arrangements/configurations of the interlocking bricks illustrated in FIG. 1 are relatively simple, it is to be understood that more complex arrangements may be used and these complex arrangements/configurations may utilize interlocking bricks of various different sizes, shapes, colors, etc.

A first arrangement/configuration 11 represents a target. The target may be established either by physically arranging interlocking bricks and then performing analysis on the arrangement/configuration, or the target may be established virtually, either by the arrangement of virtual interlocking bricks within a computer system, or by keying in arrangement characteristics, as will be described in greater detail below. The target arrangement/configuration may be established by using either the smart brick approach or the computer vision approach.

The arrangement/configuration of the target may be qualified in terms of the types of bricks used in the arrangement/configuration and how they are interconnected. For example, each brick may have its own brick ID. This ID may be specific for the brick itself (e.g. where smart bricks are used) or identical bricks may share the same ID (e.g. where computer vision identification is used). Assuming that there are 6 faces to each brick, the various faces may be designated as F1 to F6 (e.g. F1=top, F2=bottom, F3=front, F4=right, F5=back, F6=left), however, in some embodiments, faces that are identical might receive the same face designation and so it is possible that a square prism shaped brick might have only three unique faces, top, bottom, and sides.

Then, the type of connection between two faces of two bricks may be expressed. In expressing the type of connection, each possible connection type may receive its own connection ID, or the connection may be expressed in terms of x-axis and y-axis offset from being directly stacked (center-over-center) and a rotational value may be given. While it may be the case that the target is understood as rotationally invariant, the geometry of the arrangement/configuration may still be understood with respect to a particular orientation for the sake of convenience.

Accordingly, the target arrangement/configuration 11 of FIG. 1 may be qualified as F2(B01):X1,Y0,R0:F1(B02); F2(B02):X−1,Y0,R0:F1(B03) which may be understood as signifying that the second face of brick 01 is connected to the first face of brick 02 with an x-axis offset of +1, the second face of brick 02 is connected to the first face of brick 03 with an x-axis offset of −1.

Then each of the user arrangements/configurations 12-16 may be similarly expressed, for example, arrangement/configuration 12 may be expressed as F2 (B01) :X2,Y0,R0: F1 (B02); F2 (B02) :X−2,Y0,R0:F1 (B03). Arrangement/configuration 13 may be expressed as: F2 (B01):X1,Y1,R0: F1(B02); F2(B02):X−1,Y−1,R0:F1(B03). Arrangement/configuration 14 may be expressed as: F2(B01):X2,Y0,R0: F1 (B02). Arrangement/configuration 15 may be expressed as: F2(B01):X1,Y0,R0:F1(B02); F2(B02):X0,Y0,R0:F1 (B03); F2(B03): X0,Y0,R0:F1(B04). Arrangement/configuration 16 may be expressed as: F2(B01):X1,Y0,R0:F1(B02); F2(B02):X−1,Y0,R0:F1(B03).

It is to be understood that there may be multiple ways to describe the same type of connection, and so exemplary embodiments of the present invention may use a predetermined syntax to ensure the same connection is always described in the same way.

Then the expression of the target may be matched against the expression of the various user arrangements to determine that arrangement/configuration 16 is a match for the target arrangement/configuration 11.

However, as described above, exemplary embodiments of the present invention may determine an extent of similarity for the non-matching arrangements/configurations. This may be done, for example, by expressing how many of the connections are identical as a ratio of the total number of connections of the target, or even by determining a net offset for each connection that is not identical. Thus arrangement/configuration 12 varies from arrangement/configuration 11 by a single x-axis offset in 2 connections (therefore a difference score may equal 2). Arrangement/configuration 13 varies from arrangement/configuration 11 by a single x-axis offset and a single y-axis offset in 2 connections (therefore a difference score may equal 4). Arrangement/configuration 14 varies from arrangement/configuration 11 by two x-axis offsets in 1 connection, and a missing brick, which may be represented, for example, as an offset of 4 in the x-axis and 2 in the y-axis (a difference score may equal 8). Arrangement/configuration 15 varies from arrangement/configuration 11 by a single x-axis offset in 1 connection, and an extra brick, which may be expressed the same as a missing brick as above (therefore a difference score may equal 7). Arrangement/configuration 16 does not vary from arrangement/configuration 11 and therefore a difference score may equal 0.

The approach to qualifying connections and quantifying scoring is provided above as a simplified exemplary approach. Any arbitrary approach may be used, and more sophisticated approaches may be used to represent greater variability of the bricks and additional degrees of freedom in their arrangement. Various more sophisticated approaches may be used to qualify degrees of difference, such as those particular to network theory.

According to another exemplary approach, similarity points may be awarded to a given arrangement/configuration with the most points being given to an exact match in terms of brick type, brick arrangement, brick color, etc. and fewer points being awarded based on differences, with some differences, such as using a different brick color, may see a relatively minor reduction of points, while different brick type may see a relatively major reduction of points.

As described above, there may be two general approaches for determining the arrangement/configuration of interlocking blocks. The first approach is the computer vision approach. FIG. 2 is a schematic diagram illustrating an approach for identifying an arrangement of interlocking blocks in accordance with exemplary embodiments of the present invention. According to this arrangement, a camera unit 22 may be disposed in such a way as to observe interlocking blocks 21 as they are arranged. The camera unit may be embodied as a stand-alone unit (as shown) or as an integrated camera component of a computer, tablet, or smartphone. The camera 22 may have one or more lenses, for example, the camera 22 may include 2 lenses so as to better perceive the arrangement of interlocking blocks from multiple angles so that a sense of depth and perspective may be obtained. The camera 22 may be web-enabled and may be able to interface with an internet-based service for providing authentication or the camera 22 may communicate with a computer system 23 or a smartphone and/or tablet computer ("mobile device") 24. The processing of the image data acquired by the camera 22 may be performed by a cloud-based service or locally on the computer 23 or mobile device 24. The result of the processing may be a match score. The match score may be digitally signed by the application performing the processing to ensure authenticity and then access may be granted to an account, service, or application based on the match score.

According to one exemplary approach, higher match scores may be used to grant the user access to additional content, such as more challenging target arrangements/configurations, or to otherwise unlock valuable content such as music and video files.

According to some exemplary embodiments, a user account may be accessed according to the match score, with higher matches granting the user higher levels of access. For example, a user may be able to access online banking by arranging the interlocking blocks according to a target. A first match score may grant the user access to recent transactions, a second, higher, match score may grant the user access to account balances. A third, higher still, match score may grant the user the ability to make balance transfers to pre-arranged recipients. A fourth, highest, match score may grant the user the ability to designate new recipients for the purpose of balance transfers.

The second approach for determining the arrangement/configuration of the interlocking bricks is using "smart bricks." As used herein, a smart brick is understood to be an interlocking brick with embedded sensors. The smart brick may also include a microprocessor and various other components, as discussed below, however, in the broadest possible sense, a smart brick is simply an interlocking brick with at least one sensor disposed therein.

Figure 3:
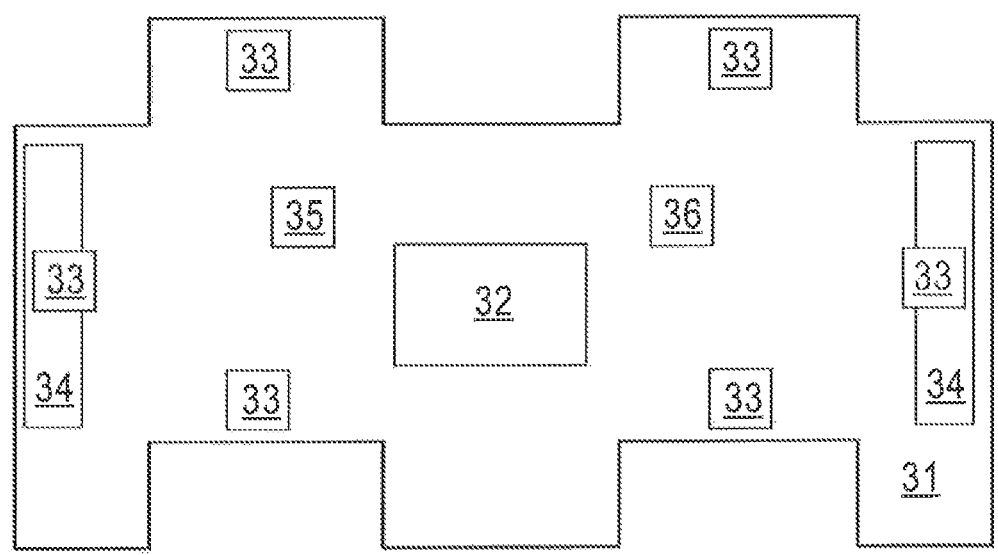
FIG. 3 is a schematic diagram illustrating a smart brick in accordance with exemplary embodiments of the present invention.

FIG. 3 is a schematic diagram illustrating a smart brick in accordance with exemplary embodiments of the present invention. The smart brick 31, shown in cut-away profile view, may include a processing core 32, which may include a microprocessor, memory, a battery, etc. for collecting information from various sensors 33 and 34 incorporated into the smart brick 31 and communicating this information, for example, via a radio 35, to a host computer/mobile device or to a cloud-based service. The wireless radio may be, for example, a Bluetooth radio or a WiFi radio. The processing core 32 may also include a radio frequency identification (RFID), near field communication (NFC), or some other embedded chip for broadcasting a unique smart brick ID, either wirelessly or by contact to adjacent smart bricks.

The sensors 33 may be embodied as proximity sensors or more simply, as connector pads for contacting corresponding connector pads of adjacent smart bricks. The smart bricks may also include pressure sensors 34 for detecting a touch and a pressure of the touch. Although not shown, the smart bricks may additionally include one or more gyroscopes, accelerometers, light detection sensors, or light emitting units.

Figure 4:
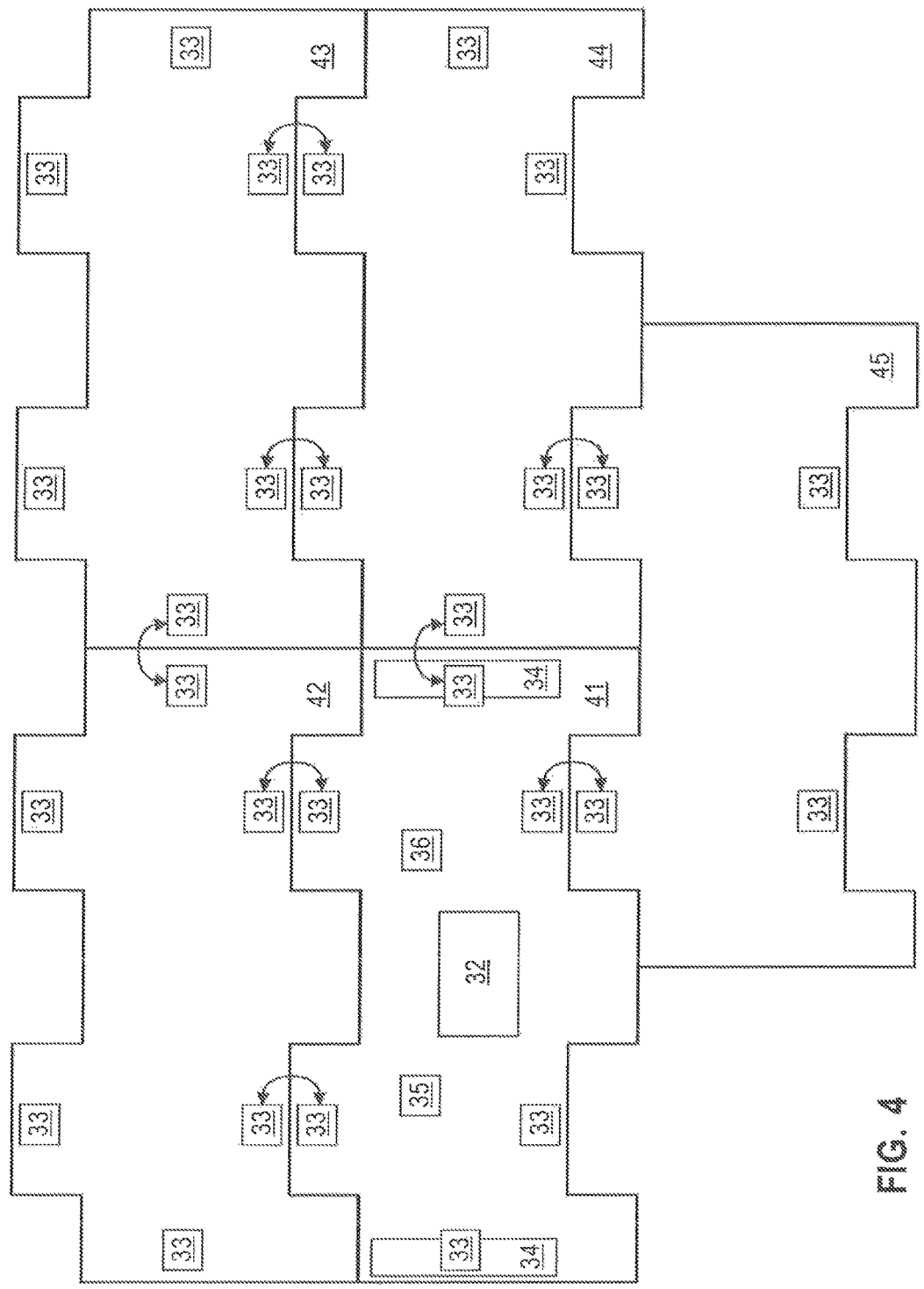
FIG. 4 is a schematic diagram illustrating interconnection of smart bricks in accordance with exemplary embodiments of the present invention.

FIG. 4 is a schematic diagram illustrating interconnection of smart bricks in accordance with exemplary embodiments of the present invention. While according to some exemplary embodiments of the present invention, all of the interlocking bricks may be full smart bricks such as that described above with respect to exemplary embodiments of the present invention, according to some exemplary embodiments of the present invention, there need only be one full smart brick that includes the processing core 32, and the other interlocking bricks may simply include a set of sensors 33 and wiring to pass the sensor data along a data bus formed by the other interlocking bricks so that the full smart brick with the processing core 32 (here shown as 41) can interpret all of the data. Alternatively, the processing core 32 may be formed within a base and the interlocking bricks may all lack the processing core 32.

As shown in FIG. 4, however, there is one full smart brick 41 which includes the processing core 32 and the other bricks 42-45 may form electrical connections to each other, for example, by the use of electrodes/connectors that are located within or next to the sensors 33.

The sensors 33 incorporated into the smart bricks may be able to detect the proximity of bricks that are connected to each other, such as between bricks 41 and 42. Additionally, the sensors 33 may be able to detect the proximity of bricks that are not directly connected to each other, such as between bricks 41 and 44. It is noted that while bricks 41 and 44 are not directly connected to each other, they may still be indirectly connected to each other, for example, by both being connected to brick 45. Exemplary embodiments of the present invention may be able to distinguish between directly connected bricks, indirectly connected bricks, and bricks that are proximate to each other without being connected at all, by using known information about which sensors 33 are disposed in interconnecting holes/raised protrusions, and which sensors 33 are disposed on brick sidewalls that have no holes/raised protrusions. This differentiation may be applicable to determining an extent of match between the user arrangement and the target arrangement.

Figure 5:
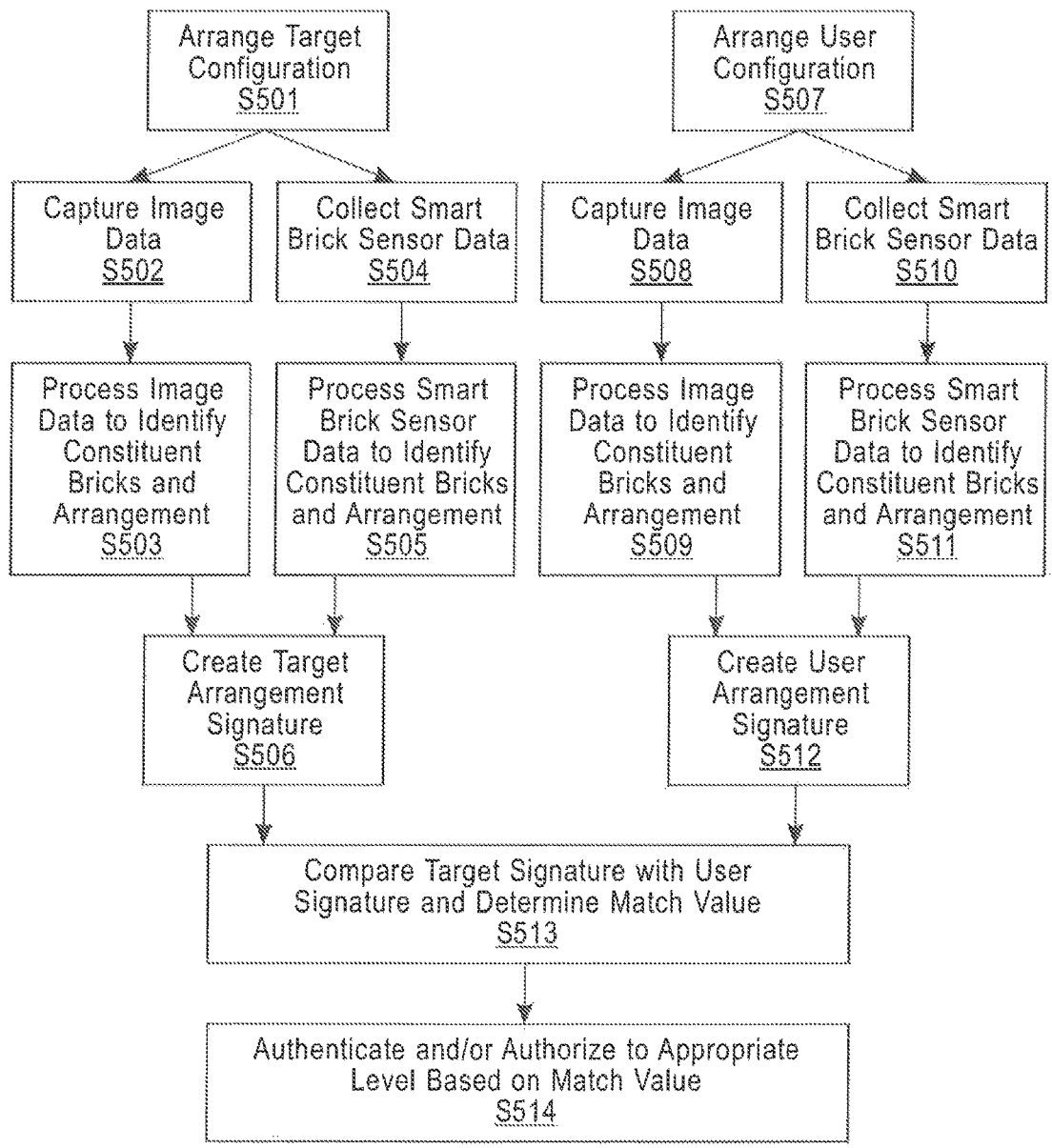
FIG. 5 is a flow chart illustrating an approach for authentication using interlocking bricks in accordance with exemplary embodiments of the present invention.

FIG. 5 is a flow chart illustrating an approach for authentication using interlocking bricks in accordance with exemplary embodiments of the present invention. As discussed above, the target arrangement/configuration may be programmed either by arranging interlocking bricks in the desired arrangement/configuration and then recognizing the arrangement/configuration according to the same approach by which the user's configurations are identified. This is the approach discussed herein and illustrated in FIG. 5. However, the target arrangement/configuration may alternatively be manually programmed without having to compose an arrangement/configuration for the target.

Accordingly, first, the target configuration may be arranged (Step S501). What happens next may depend on the approach for arrangement/configuration detection being used. As discussed above, either a computer vision technique may be used to identify the arrangement/configuration or smart bricks may be used. Where computer vision is used, image data may be captured (Step S502), for example, using a camera device. Thereafter, the image data may be processed to identify which sorts of bricks are included in the target arrangement/configuration and to identify how these bricks are arranged and configured (Step S503). From this interpretation, a target arrangement/configuration signature may be created (Step S506). This signature may utilize the approach discussed above for describing the connections between bricks, or another suitable approach may be used.

Where smart bricks are used, the smart brick sensor data may be collected (Step S504) and using this data, the constituent bricks and their arrangement/configuration may be identified (Step S505) and the target signature may be generated therefrom (Step S506).

The target signature may be saved as a file. When the user is ready to be authenticated, the user may create an arrangement of interlocking bricks (Step S507). Here again, the approach for recognizing the arrangement/configuration will depend on whether computer vision is being used or smart bricks. Where computer vision is being used, first the image data may be captured (Step S508) and then the image data of the user-arranged configuration may be processes to identify constituent bricks and the arrangement thereof (Step S509). As was the case with the target arrangement, the user-configured arrangement may also have a signature created for it from the identified constituent bricks and their arrangement (Step S512). Where smart bricks are used, the sensor data may be collected (Step S510) and the collected sensor data may be processed to identify constituent bricks and the arrangement thereof (Step S511) so that the signature may be generated therefrom (Step S512).

The signature for the user-arrangement may then be compared against the target signature to determine a value representing an extent of match between the two signatures (Step S513). This may be performed, for example, as described in detail above. A table may then be consulted to determine an appropriate level of authentication for the determined match value. The user may then be authenticated to the appropriate level (Step S514).

In some exemplary embodiments of the present invention, authentication may also be based, at least in part, on a pressure sensing sequence as sensed by the one or more pressure sensors 34 of the arrangement/configuration. This may be done by incorporating the sensed pressure sequence into the signatures of the target and the user-arranged configuration, but alternatively, by creating a separate challenge. For example, after the user has been authenticated, either by the approach discussed above, or by the entry of a password, the user may later be challenged for the pressure sequence, either by an explicit command, or by the displaying of a discrete cue that is meaningful to the authorized user but not widely known beyond that user. The user may then be given some amount of time with which to impart the pressure sequence before the user is de-authenticated for failing to satisfy the pressure challenge. It is to be noted that rather than (or in addition to) sensing squeezes, exemplary embodiments of the present invention may sense swipes upon the bricks and authentication may be aided by a sequence of swipes. Where squeezes are used, each squeeze may be characterized in terms of pressure as a function of time. Pressure rhythms may also be used for authentication, with the user applying pressure as a rhythm, which may be contemplated as a cyclical waveform.

Other factors that may be considered may include the number of fingers used to apply force, pressure strength, rate of change of pressure, and ADSR envelope (pressure attack time, decay time, sustain level, release level).

According to some exemplary embodiments of the present invention, in addition to, or rather than looking at a final arrangement/configuration, the process by which a user assembles the interlocking blocks may be monitored and compared to that of the target. In this way, an order in which blocks are interlocked may influence the degree of matching and therefore may influence the authentication level. According to one such approach, credit may be apportioned based on the final configuration (e.g. 50% credit), the order of attachment (e.g. 30% credit), and use of correctly colored bricks (e.g. 20% credit), although other percentages may be used and other criteria may be used as well. An administrator may determine criteria, percentages, and how many points are required to access each level of authentication.

The bricks may also be programmed to provide feedback on a correct and/or incorrect sequence. For example, upon providing a correct pressure sequence, the interlocking smart bricks may vibrate or generate an audible tone. The bricks may also be configured with a display device or other illumination device for providing a visible signal upon being provided the correct and/or incorrect pressure sequence.

The interlocking bricks may be tagged using various approaches to aid in either computer vision identification or smart brick identification. For example, each brick may be labelled with a barcode, quick response (QR) code, color code, so that it may be easy to identify the brick using computer vision. Each brick may also be outfitted with various light-emitting diodes (LEDs) to display a visual signal representing, for example, what sorts of bricks may be obstructed from view, and how they might be arranged.

It is to be understood that while exemplary embodiments of the present invention have been described herein in terms of three-dimensional interlocking bricks, the present invention may be practiced with patterns of two-dimensional interlocking bricks that may either be shaped like jigsaw puzzle pieces or as flat versions of traditional interlocking bricks. 3D interlocking bricks may also be used to reproduce a 2D key, for example, by examining the user's arrangement/configuration from a top-down view.

Moreover, according to exemplary embodiments of the present invention, physical interlocking bricks need not be used, and virtual interlocking blocks may be manipulated by a user using a graphical user interface to the same effect as described above with respect to physical interlocking bricks.

Figure 6:
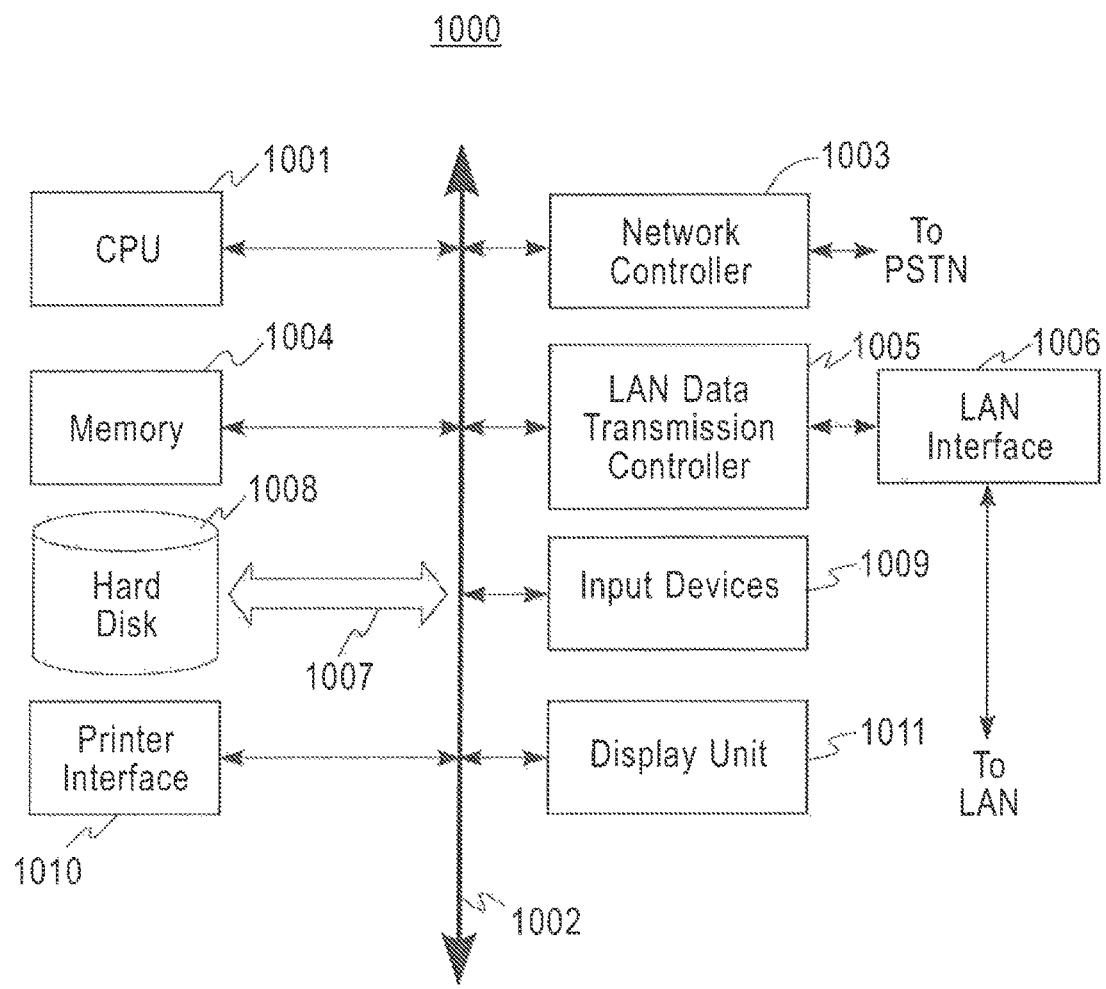
FIG. 6 shows an example of a computer system capable of implementing the method and apparatus according to embodiments of the present disclosure.

FIG. 6 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system of interlocking smart bricks, comprising:
   a plurality of interlocking smart bricks, each of which includes a shell comprising at least one raised protrusion and at least one hole, the at least one raised protrusion being configured for insertion into a hole having the same shape as the at least one hole, and the at least one hole being configured for receiving a raised protrusion having the same shape as the at least one raised protrusion;
   a plurality of sensors disposed within the shell of each of the plurality of interlocking smart bricks, each of the plurality of sensors being configured to detect a proximity and spatial relationship of one or more additional smart bricks of the plurality of interlocking smart bricks;
   a processor for receiving proximity and spatial relationship detection data from the plurality of sensors;
   a radio transmitter for transmitting the proximity and spatial relationship detection data to a host device; and
   the host device for receiving the proximity and spatial relationship detection data, determining a spatial arrangement of each of the plurality of interlocking brick relative to each other therefrom, comparing the determined spatial arrangement of each of the plurality of interlocking brick relative to each other with a known target arrangement, determining a degree of match between the spatial arrangement of each of the plurality of interlocking brick relative to each other and the known target arrangement based on the comparison, and authenticating a user to one of a plurality of authentication levels based on the degree of match.

2. The system of claim 1, further comprising a pressure sensor disposed within the shell and configured to sense a degree of pressure applied to the shell, wherein the processor further receives data from the pressure sensor, wherein the transmitter further transmits the pressure sensor data to the host device, wherein the host device further receives the pressure sensor data, and wherein the host device further compares the pressure sensor data to a known target pressure profile, determines a degree of match between the pressure sensor data and the known target pressure profile, and authenticates the user to the one of the plurality of authentication levels based on the degree of match between the pressure sensor data and the known target pressure profile.

3. A system of interlocking smart bricks, comprising:
a first interlocking brick comprising at least one raised protrusion disposed thereon and at least one sensor disposed thereon, the first interlocking brick farther comprising a processor;
a second interlocking brick comprising at least one hole configured to receive the at least one raised protrusion of the first interlocking brick and to interlock with the first interlocking brick thereby; and
a host device, wherein the processor is configured to receive sensor data from the at least one sensor and to transmit the received sensor data to the host device, and wherein the host device is configured to receive the transmitted sensor data and determine a spatial relationship between the first interlocking brick and the second interlocking brick therefrom and to authenticate a user based on the determined spatial relationship,
wherein the determined spatial relationship including at least which face of the first interlocking brick is in contact with which face of the second interlocking brick and a degree of offset between the first and second interlocking brick.

4. The system of claim 3, further comprising a pressure sensor disposed within the at least one interlocking brick, the pressure sensor configured to sense a degree of pressure applied to the at least one interlocking brick, wherein the processor further receives data from the pressure sensor and transmits the received pressure sensor data to the host device, wherein the host device further receives the pressure sensor data, and wherein the host device further authenticates the user based on the pressure sensor data.

5. The system of claim 3, wherein the host device is configured to authenticate the user based on the determined spatial relationship by:
comparing the determined spatial relationship between the first interlocking brick and the second interlocking brick with a known target relationship;
determining a degree of match between the determined spatial relationship and the known target relationship based on the comparison; and
authenticating the user to one of a plurality of authentication levels based on the degree of match.

6. A method for authenticating a user, comprising:
receiving arrangement data describing an arrangement of a plurality of interlocking bricks;
comparing the received arrangement data with a known target arrangement;
determining a degree of match between the received arrangement data and the known target arrangement based on the comparison; and
authenticating a user to one of a plurality of authentication levels based on the degree of match,
wherein the received arrangement data includes at least which face of a first interlocking brick, of the plurality of interlocking bricks, is in contact with which face of a second interlocking brick, of the plurality of interlocking bricks, and a degree of offset between the first and second interlocking brick.

7. The method of claim 6, wherein the arrangement of the plurality of interlocking bricks includes information pertaining to an identity of each of the plurality of interlocking bricks and the information pertaining to a spatial arrangement of each of the plurality of interlocking bricks relative to each other.

8. The method of claim 6, wherein the known target arrangement represents a predetermined model arrangement of a second plurality of interlocking bricks.

9. The method of claim 6, wherein authenticating the user to one of the plurality of authentication levels based on the degree of match includes providing access to more functions, features, rewards, or content to the user when the degree of match is relatively high and providing access to fewer functions, features, rewards, or content to the user when the degree of match is relatively low.

10. The method of claim 6, wherein the authentication of the user is for an account, an application, or a service.

11. A computer system comprising:
a processor; and
a non-transitory, tangible, program storage medium, readable by the computer system, embodying a program of instructions executable by the processor to perform method steps for authenticating a user, the method comprising:
receiving arrangement data describing an arrangement of a plurality of interlocking bricks;
comparing the received arrangement data with a known target arrangement;
determining a degree of match between the received arrangement data and the known target arrangement based on the comparison; and
authenticating a user to one of a plurality of authentication levels based on the degree of match,
wherein the received arrangement data includes at least which face of a first interlocking brick, of the plurality of interlocking bricks, is in contact with which face of a second interlocking brick, of the plurality of interlocking bricks, and a degree of offset between the first and second interlocking brick.

12. The computer system of claim 11, wherein the arrangement of the plurality of interlocking bricks includes information pertaining to an identity of each of the plurality of interlocking bricks and the information pertaining to a spatial arrangement of each of the plurality of interlocking bricks relative to each other.

13. The computer system of claim 11, wherein the known target arrangement represents a predetermined model arrangement of a second plurality of interlocking bricks.

14. The computer system of claim 11, wherein authenticating the user to one of the plurality of authentication levels based on the degree of match includes providing greater access to the user when the degree of match is relatively high and providing reduced access to the user when the degree of match is relatively low.

15. The computer system of claim 11, wherein the authentication of the user is for an account, an application, or a service.

* * * * *